United States Patent [19]

Jones

[11] Patent Number: 4,528,996
[45] Date of Patent: Jul. 16, 1985

[54] ORIFICE PLATE CLEANING SYSTEM
[75] Inventor: David E. Jones, Richardson, Tex.
[73] Assignee: The Mead Corporation, Dayton, Ohio
[21] Appl. No.: 564,264
[22] Filed: Dec. 22, 1983
[51] Int. Cl.³ .............................................. B08B 3/04
[52] U.S. Cl. ................... 134/104; 134/166 R; 15/302; 118/302; 346/75
[58] Field of Search ............... 134/104, 166 R, 169 R, 134/184, 198; 118/17, 70, 104, 203, 302; 15/302; 346/75, 140; 239/112

[56] References Cited

U.S. PATENT DOCUMENTS

| Re. 31,357 | 8/1983 | Cone | 346/75 |
|---|---|---|---|
| 3,800,702 | 4/1974 | Roberts | 118/203 X |
| 3,839,721 | 10/1974 | Chen et al. | 346/75 |
| 4,048,639 | 9/1977 | Walsh et al. | 346/75 |
| 4,096,626 | 6/1978 | Olsen et al. | 346/75 X |
| 4,286,272 | 8/1981 | Schwob | 346/75 |
| 4,296,418 | 10/1981 | Yamazaki et al. | 346/75 |
| 4,297,712 | 10/1981 | Lammers et al. | 346/75 |

Primary Examiner—Philip R. Coe
Assistant Examiner—Frankie L. Stinson
Attorney, Agent, or Firm—Biebel, French & Nauman

[57] ABSTRACT

An orifice plate cleaning system having a source of solvent, an elongate orifice plate having a plurality of orifices therethrough and an elongate plate face composed of a solvent-wettable material and oriented to be inclined downwardly from the horizontal, and a solvent conduit for depositing solvent at an upper end of the plate face so that solvent flows downwardly by gravity to wet the plate face completely and remove dried ink deposits therefrom. The system includes a vacuum tube adjacent a lower end of the plate face to remove the solvent containing dissolved ink from it. In preferred embodiments, the plate face includes sharply-defined, opposing longitudinal edges which prevent the solvent from running off of the orifice plate, a side plate having a surface made of a solvent-wettable material which abuts an upper longitudinal edge of the plate face so that it is wetted by a solvent flowing along the orifice plate, a second side plate made of a non-solvent-wettable material abutting a lower longitudinal edge of the orifice plate, or a support plate for supporting the orifice plate and made of a non-solvent-wettable material, all acting to prevent the solvent from running off of the plate face of the orifice plate to other print head components during a cleaning operation.

9 Claims, 6 Drawing Figures

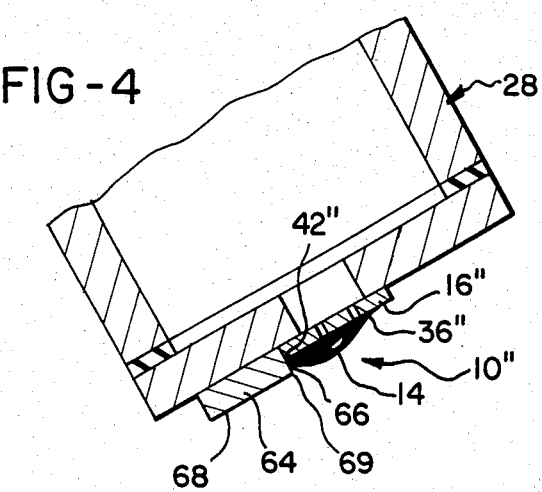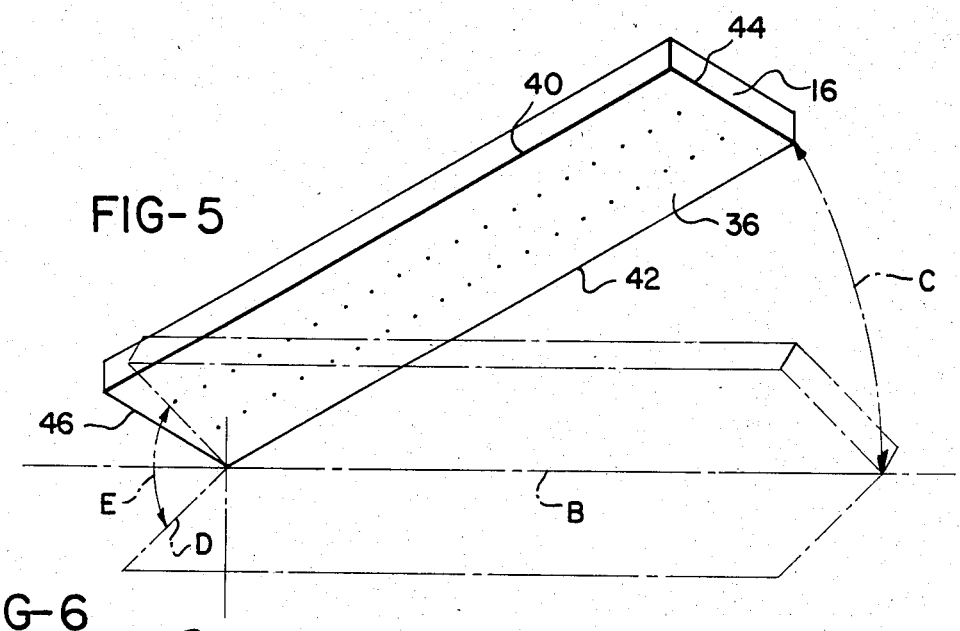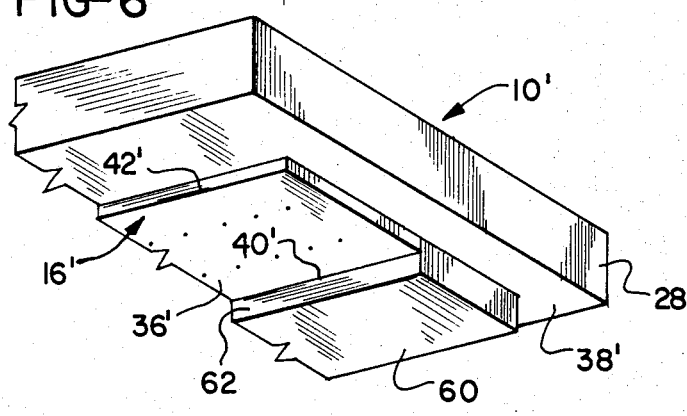

ORIFICE PLATE CLEANING SYSTEM

BACKGROUND OF THE INVENTION

The present invention relates to ink jet printing devices, and more particularly, to systems for cleaning the orifice plates of ink jet print heads.

It is essential to the proper operation of an ink jet printing apparatus that the orifices of the ink jet print head remain free from dried deposits of ink which may tend to clog the orifices and impair the operation of the print head. As a result, many types of devices have been devised to eliminate collections of dried ink from the orifices of an ink jet print head. Some of these devices employ ink solvents and provide means for flushing the orifices and orifice plate with such a solvent to dissolve these deposits of ink.

For example, in the Yamazaki et al. U.S. Pat. No. 4,296,418, an ink jet printing apparatus is disclosed in which an ink clog is removed from a nozzle orifice by causing solvent to flow through the print head. Solvent is caused to flow through a cap, which is placed over the nozzle of the printer, through the orifices of the nozzle, and to a solvent receptacle upstream of the print head. After a predetermined period of time, the cap is removed from the nozzle and the printing operation is resumed.

The Bader et al. U.S. Pat. No. 4,343,013 discloses a nozzle plate for an ink jet print head which is made of glass and provides an inner surface which is wettable by an aqueous ink. The outer surface of the nozzle plate is coated with a non-wetting material, such as plastic, to prevent deposits of ink at the front surface and around the orifices formed in the plate.

It is believed that a disadvantage with such systems is that it is difficult to clean the outer surface of the nozzle plate with an appropriate solvent since that outer surface is made of a non-wettable material which would cause the solvent to bead rather than form a thin film which would cover the surface and dissolve any ink deposits. Furthermore, in order to clean the orifices formed in such a nozzle plate, it is necessary to provide structure to which either conveys solvent to the interior of the ink jet print head so that it flowed outwardly through the orifices, or, as in the Yamazaki et al. device, collects solvent passing through the orifices at a location upstream of the print head.

The patents to Graf, U.S. Pat. Nos. 4,356,500 and 4,283,730 disclose ink jet printers which provide means for minimizing the accumulation of ink on catchers, a problem which may be considered analogous to minimizing ink accumulation on orifice plates and nozzles of print heads. Both of those patents disclose ink jet printers in which the catcher and orifice plate are enclosed in a gas chamber which promotes the evaporation of ink from those components. The catcher is made of a hydrophobic material such as carbon, polyethylene, polypropylene, or Teflon, to prevent accumulation of dried ink. As with orifice plates, the use of a hydrophobic material to form the catcher may increase the difficulty in efficiently flushing the catcher with a solvent to remove any dried deposits of ink.

Accordingly, there is a need for an ink jet printer which is designed to facilitate the removal of dried ink deposits from the outer surface of the orifice plate. Furthermore, such an orifice plate cleaning system should be relatively simple in construction and not require conduits and connections for flushing a solvent through the print head.

SUMMARY OF THE INVENTION

The present invention is an orifice plate cleaning system in which the orifice plate of an ink jet printer is made of a solvent-wettable material so that, rather than beading upon the orifice plate, the solvent flows over it to form a thin film which dissolves and removes deposits of ink from the outer surface of the plate and from the orifices. The orifice plate is inclined at an angle to the horizontal, and the system includes a conduit which deposits solvent at an upper end of the orifice plate so that the solvent flows downwardly by gravity over the entire outer face of the orifice plate. A solvent removal component, such as a vacuum tube, is provided at a lower end of the orifice plate to remove the solvent and dissolved ink which has flowed over the orifice plate. In order to prevent the solvent from flowing from the orifice plate to the remainder of the print head, the orifice plate is raised from the supporting surface of the print head and includes a pair of sharply-defined longitudinal edges which prevent the solvent from flowing from the outer surface of the orifice plate and down the sides to the remainder of the print head.

In a preferred embodiment, the supporting surface of the print head is made of a non-solvent-wettable material which resists the tendency of the solvent to flow from the orifice plate to the supporting surface, and would prevent solvent from forming a film on the remainder of the print head. In another embodiment, a side plate is provided which is made of a solvent-wettable material and extends along an upper longitudinal edge of the orifice plate. The side plate includes a side surface which is angled relative to and abuts the upper longitudinal edge of the plate. Solvent flowing along the orifice plate is attracted to the side plate and wets the abutting surface. The surface profile of the solvent as it flows down the orifice plate is deformed by contact with the side plate so that it has a tendency not to flow from the orifice plate to surrounding structure.

In a different embodiment, a side plate is provided which is made of a non-solvent wettable material and is positioned to extend along and abut the lower longitudinal edge of the orifice plate. This side plate includes a side surface which is raised from and is angled relative to the longitudinal edge. Solvent flowing along the orifice plate is repelled from this side plate and is prevented from flowing over it to the rest of the print head.

By providing an orifice plate which is angled relative to the horizontal and is made of a solvent-wettable material, a solvent may be deposited on an upper end and, by the force of gravity alone, wet the entire surface of the orifice plate to remove all deposits of dried ink from the surface and from the orifices.

Accordingly, it is an object of the present invention to provide an orifice plate cleaning system which utilizes the flow of gravity to dissolve ink deposits from the outer surface and orifices of an orifice plate; a cleaning system which is relatively simple in construction and does not add an excessive amount of structure to an ink jet printing system; and a cleaning system which does not require the use of exotic and expensive materials which would increase the overall cost of the ink jet printer.

Other objects and advantages of the invention will be apparent from the following description, the accompanying drawings and the appended claims.

BRIEF DESCRIPTION OF THE DRAWINGS

FIG. 4 is a detail end view in section of the print head of another embodiment of the invention;

FIG. 5 is a somewhat schematic, perspective view of the preferred spatial orientation of the orifice plate of the present invention; and FIG. 6 is a detailed in perspective of the alternate embodiment shown in FIG. 3.

DETAILED DESCRIPTION OF THE PREFERRED EMBODIMENTS

Figure 1:
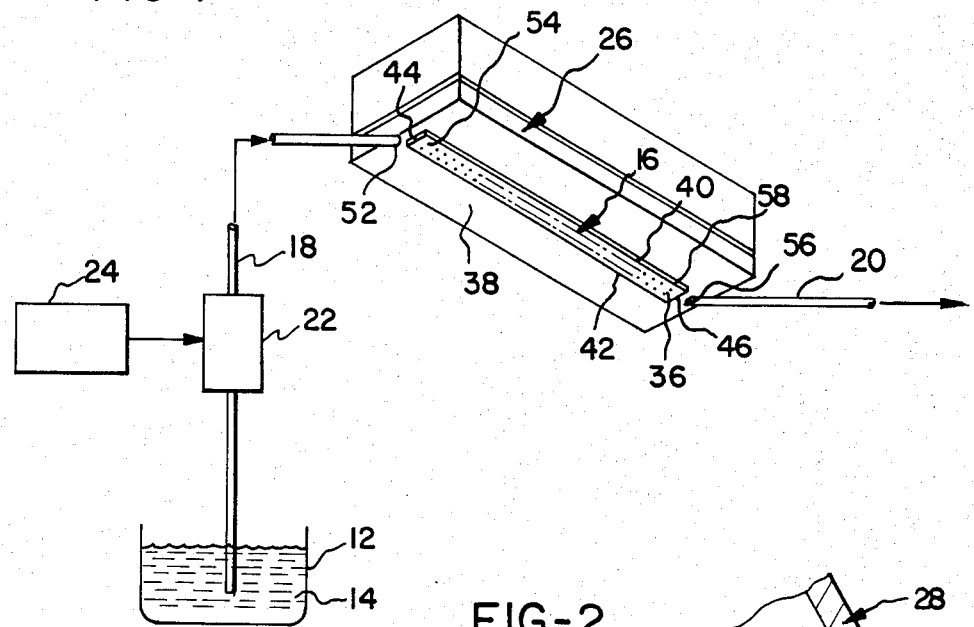
FIG. 1 is a somewhat schematic, perspective view of a preferred embodiment of the orifice plate cleaning system of the present invention.

As shown in FIG. 1, the orifice plate cleaning system, generally designated 10, comprises a reservoir 12 containing a solvent 14, an orifice plate 16, a solvent supply conduit 18 and a solvent removal conduit 20. The solvent supply conduit includes a solenoid pump 22 which can be actuated to pump solvent 14 through the conduit 18 by a control 24 of well-known design.

Figure 2:
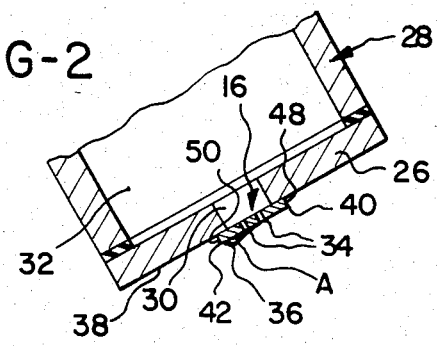
FIG. 2 is a detail end view in section of the print head of FIG. 1.

As shown in FIGS. 1 and 2, the orifice plate 16 is mounted on a support plate 26 of an ink jet print head 28 which forms a part of an ink jet printer (not shown). The support plate 26 includes a slot 30 which allows ink to flow from the reservoir 32 of the print head 28 through a plurality of orifices 34 extending through the orifice plate 16. The print head 28 may be of a well-known design, such as that disclosed in Mathis U.S. Pat. No. 3,701,998, the disclosure of which is incorporated herein by reference.

However, the print head 28 differs from prior art print heads in that the orifice plate 16 is in the form of an elongate, rectangular bar which is mounted on the support plate 26 so that it provides a plate face 36 which is raised from the outer surface 38 of the support plate and is bordered by a pair of opposing longitudinal edges 40, 42, and opposing transverse edges 44, 46.

It is necessary for the proper operation of the cleaning system 10 that the plate face 36 of the orifice plate 16 be raised from the outer surface 38 of the support plate 26. Side walls 48, 50 of the orifice plate 16 are preferably oriented at right angles to the flat surface 36 of the orifice plate, thereby forming the sharply-defined edges 40, 42. It is not necessary for the side walls 48, 50 to form a right angle with the outer surface 36, so long as the side walls meet the plate face at angles sufficient to form the edges 40, 42.

The plate face 36 of the orifice plate 16 is coated with a solvent-wettable material such as glass or ceramic. Alternately, the entire orifice plate 16 can be made of such a solvent-wettable material. An appropriate ceramic is Fotoceran (a registered trademark of Corning Glass Works, Corning, N.Y.). The outer surface of the support plate 26 is coated with a non-solvent-wettable material such as a fluorocarbon polymer. An appropriate fluorocarbon polymer is polytetrafluoroethylene or Teflon (a registered trademark of E. I. DuPont de Nemours Co., Wilmington, Del.).

As shown in FIG. 1, the print head 28 is oriented such that the orifice plate 16 is inclined downwardly relative to the horizontal both in a longitudinal direction and about a longitudinal axis (see FIG. 5), at least during an orifice plate cleaning phase of printer operation. The solvent supply conduit 18 includes a terminal end 52 which is positioned adjacent to the upper end 54 of the orifice plate 16. The solvent removal conduit 20, which preferably is connected to a source of vacuum (not shown), includes an open end 56 which is positioned adjacent to the lower end 58 of the orifice plate 16.

The operation of the orifice plate cleaning system 10 as shown in FIGS. 1 and 2 is as follows. When it is desired to clean the plate face 36 of the orifice plate 16, the ink supply to the reservoir 32 is shut off, terminating the printing operation. The control 24 activates the solenoid pump 22 which draws solvent 14 from the tank 12 and conveys it through the conduit 18 where the solvent passes through the end 52 of the conduit and is deposited at the upper end 54 of the orifice plate 16. The solvent 14 wets the entire surface of plate face 36, and flows downwardly along the face under the influence of gravity. In flowing downwardly along the surface 36, the solvent 14 dissolves dried accumulations of ink on the surface as well as in the orifices 34. The solvent 14 collects at the lower end 58 of the orifice plate 16, where it is drawn from the orifice plate through the removal conduit 20.

To stop operation of the cleaning system 10, the control 24 stops the solenoid pump 22 from pumping fluid to the upper end 54 of the orifice plate 16. Any solvent remaining on the outer surface 36 of the orifice plate will evaporate under normal conditions. However, the evaporation can be accelerated by the application of a blast of compressed air by well-known devices.

As the solvent 14 travels along the plate face 36 orifice plate 16, it assumes a cross sectional profile A shown in FIG. 2. The sharply-defined edges 40, 42 of the orifice plate 16 prevent the solvent from flowing from the surface 36 onto the side walls 48, 50 or outer surface 38 of the support plate 26. Should solvent 14 inadvertently flow to the outer surface 38, its non-wettable nature will prevent a film of solvent from building up on the support plate 26.

The orifice plate cleaning system 10 can be used to apply solvents for oil based inks and acetone based inks, as well as for water based inks. Appropriate solvents for water based inks are described in the Stoneburner U.S. Pat. No. 3,891,191 and Paranjpe U.S. Pat. No. 4,031,561, the disclosures of which are incorporated herein by reference. When using solvents to dissolve accumulations of a water based ink, it is preferable to provide a mixture including water and 10-15% alcohol, such as methyl alcohol, by volume. The presence of alcohol reduces the contact angle made by the solvent with the surface 36 of the orifice plate 16, and ensures that the entire surface is wetted by the solvent.

It is also desirable to provide a solvent which contains an oil component, so that a residue of oil remains on the plate face 36 of the orifice plate 16 after the cleaning step is completed. This promotes the wetting of the plate face 36 during subsequent cleaning operations and also would form a thin film over the orifices 34 to prevent the drying of ink within the orifices.

Figure 3:
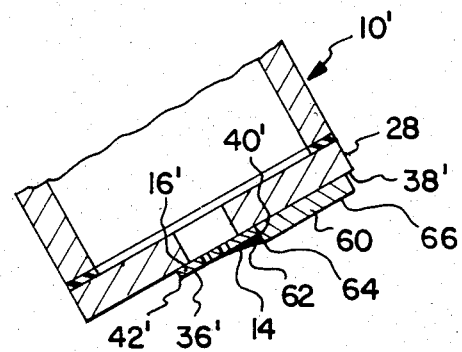
FIG. 3 is a detail end view in section of the print head of an alternate embodiment of the invention.

An alternate embodiment of the system 10' is shown in FIGS. 3 and 6. In this embodiment, a side plate 60 is mounted on the plate face 38' of the print head 28. The side plate 60 is a rectangular bar which includes a side wall 62 of sufficient thickness to extend above the outer surface 36' of the orifice plate 16'. The side plate 60 is positioned such that the side wall 62 extends along and abuts the longitudinal edge 40' of the orifice plate 16'.

Preferably, the side plate 60 is made of a solvent-wettable material such as the aforementioned glass or ceramic, although it is necessary only that the side wall 62 be solvent-wettable. It is also preferable that the side wall 62 form a sharply defined edge 64 with a top wall 66 of the side plate 60.

As shown best in FIG. 3, during the cleaning step of printer operation, solvent 14 deposited at an upper end of the plate 16' wets the entire plate face 36' as it flows downwardly toward the lower end. The presence of the side plate 60 causes the profile of the solvent 14 to assume the shape shown in FIG. 3 in which the side wall 62 of the side plate becomes wetted and draws the bulk of the solvent toward the edge 40'. Therefore, the use of such a side plate 60 prevents solvent 14 from running over the lower longitudinal edge 42' of the orifice plate 16'. The procedure for cleaning the orifice plate 16', however, is the same as that previously described with regard to the embodiment of FIGS. 1 and 2.

A third embodiment of the cleaning system 10" is shown in FIG. 4. In this embodiment, the structure of the print head 28 is identical to that for FIGS. 1, 2 and 5, but a side plate 64 is provided which includes a side wall 66 that extends along and abuts the lower longitudinal edge 42" of the orifice plate 16". The side wall 66, and preferably the entire side plate 64, is formed of a non-solvent-wettable material such as a fluorocarbon polymer of the type previously described in reference to the outer surface 38 of the support plate 26 (FIG. 1). Preferably, the side plate 64 is made of metal or plastic and provided with a coating on its side wall 66 and top wall 68 of the non-solvent-wettable material.

As solvent 14 flows along the surface 36" of the orifice plate 16", contact with the non-solvent-wettable material of the side wall 66 causes the solvent to assume the cross sectional profile shown in FIG. 4, so that the solvent is prevented from running over the lower longitudinal edge 42" of the orifice plate 16". The side wall 66 meets the top wall at a sharply defined edge 69. The edge 69 also prevents the solvent from flowing from the side wall 66.

Although the orifice plate 16 need only be inclined from the horizontal sufficiently to cause solvent to flow downwardly along its outer surface 36, optimal results have been obtained when the orifice plate is oriented as shown in FIG. 5. In this orientation, the longitudinal edges 40, 42 are inclined from a horizontal line B at an angle C of 45°. The transverse edges 44, 46 are inclined from a horizontal line D at an angle E of 45°. Therefore, the orifice plate is tilted from the horizontal an angle of 45° and is pivoted 45° about a longitudinal axis parallel to edges 42, 44. This inclination in two directions enables solvent to cover the plate face 36 completely during a cleaning operation.

While the forms of apparatus herein described constitute preferred embodiments of this invention, it is to be understood that the invention is not limited to these precise forms of apparatus, and that changes may be made therein without departing from the scope of the invention.

What is claimed is:

1. An orifice plate cleaning system comprising:
a source of solvent;
an elongate orifice plate adapted to be mounted on an ink jet print head, said orifice plate including a plurality of orifices therethrough and an elongate plate face composed of a solvent-wettable material and oriented to be inclined downwardly from the horizontal, said plate face having opposing, sharply-defined longitudinal edges positioned to be raised from a supporting surface of an associated print head;
means, connected to said solvent source, for conveying solvent to an upper end of said plate face and depositing solvent thereon, whereby solvent may flow downwardly along plate face and over said orifices to dissolve ink therefrom;
means associated with a lower end of said plate face for removing solvent therefrom; and
means for supporting said orifice plate having an outer surface of a non-solvent-wettable material.

2. The system of claim 1 wherein said plate face is positioned such that transverse edges and said longitudinal edges thereof are inclined to the horizontal at angles of about 45°.

3. The system of claim 2 wherein said system further comprises a solvent consisting of water and about 10% to 15% by volume of methyl alcohol.

4. The system of claim 3 wherein said solvent-wettable material is selected from the group consisting of glass and ceramic.

5. The system of claim 4 wherein said non-solvent-wettable material is a fluorocarbon polymer.

6. An orifice plate cleaning system comprising:
a source of solvent;
an elongate orifice plate adapted to be mounted on an ink jet print head, said orifice plate including a plurality of orfices therethrough and an elongate plate face composed of a solvent-wettable material and oriented to be inclined downwardly from the horizontal, said plate face having opposing, sharply-defined longitudinal edges positioned to be raised from a supporting surface of an associated print head;
means, connected to said solvent source, for conveying solvent to an upper end of said plate face and depositing solvent thereon, whereby solvent may flow downwardly along said plate face and over said orifices to dissolve ink therefrom;
means associated with a lower end of said plate face for removing solvent therefrom; and
a side plate having a side wall angled to and raised relative to said plate face, said side walls being positioned to extend along and abut an upper one of said longitudinal edges, and made of a solvent-wettable material.

7. The system of claim 6 wherein said plate includes a top wall and said side wall meets said top wall to form a sharply-defined edge.

8. An orifice plate cleaning system comprising:
a source of solvent;
an elongate orifice plate adapted to be mounted on an ink jet print head, said orifice plate including a plurality of orifices therethrough and an elongate plate face composed of a solvent-wettable material and oriented to be inclined downwardly from the horizontal, said plate face having opposing, sharply-defined longitudinal edges positioned to be raised from a supporting surface of an associated print head;
means, connected to said solvent source, for conveying solvent to an upper end of said plate face and depositing solvent thereon, whereby solvent may flow downwardly along said plate face and over said orifices to dissolve ink therefrom;

means associated with a lower end of said plate face for removing solvent therefrom; and a side plate having a side wall angled to and raised relative to said plate face, said side wall being positioned to extend along and abut a lower one of said longitudinal edges, and made of a non-solvent-wettable material.

9. The system of claim 8 wherein said plate includes a top wall and said side wall meets said top wall to form a sharply-defined edge.

* * * * *